(12) United States Patent
Bae et al.

(10) Patent No.: US 9,323,292 B2
(45) Date of Patent: Apr. 26, 2016

(54) PORTABLE TERMINAL

(71) Applicant: Samsung Electronics Co., Ltd., Gyeonggi-do (KR)

(72) Inventors: Chang-Seok Bae, Gyeonggi-do (KR); Seung-Hyub Baek, Gyeonggi-do (KR); Jong-Cheon Wee, Gyeonggi-do (KR); Sung-Kyu Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 246 days.

(21) Appl. No.: 13/856,068

(22) Filed: Apr. 3, 2013

(65) Prior Publication Data

US 2013/0265715 A1    Oct. 10, 2013

(30) Foreign Application Priority Data

Apr. 9, 2012  (KR) .................. 10-2012-0036824

(51) Int. Cl.
| | | |
|---|---|---|
| *G06F 1/16* | (2006.01) | |
| *H04M 1/18* | (2006.01) | |
| *H04M 1/02* | (2006.01) | |
| *H04B 1/38* | (2015.01) | |

(52) U.S. Cl.
CPC .............. *G06F 1/1656* (2013.01); *H04M 1/18* (2013.01); *H04B 2001/3894* (2013.01); *H04M 1/0262* (2013.01); *H04M 1/0283* (2013.01)

(58) Field of Classification Search
CPC ........................................................ G06F 1/16
USPC ............. 361/679.01–679.45, 679.55–679.61, 361/724–747, 752–759, 796–837; 455/575.1–575.5, 347, 550.1, 90.3
See application file for complete search history.

(56) References Cited

U.S. PATENT DOCUMENTS

| | | | | |
|---|---|---|---|---|
| 4,225,970 A | * | 9/1980 | Jaramillo ............. | H04B 1/3833 455/345 |
| 4,584,718 A | * | 4/1986 | Fuller ................. | G11B 33/025 181/149 |
| 5,896,277 A | * | 4/1999 | Leon ................... | H01M 2/1022 361/814 |
| 6,349,824 B1 | * | 2/2002 | Yamada ............... | G03B 17/08 150/165 |
| 6,525,928 B1 | * | 2/2003 | Madsen ............... | G06F 1/1628 361/679.56 |
| 6,594,472 B1 | * | 7/2003 | Curtis ................. | H04M 1/0283 379/428.01 |
| 6,641,288 B1 | * | 11/2003 | Olsen .................. | B60Q 1/2615 362/477 |
| 6,942,153 B1 | * | 9/2005 | Yuan ................... | G06F 1/1626 235/380 |
| 6,950,516 B2 | * | 9/2005 | Pirila ................. | B29C 45/1676 379/433.12 |
| 6,983,130 B2 | * | 1/2006 | Chien ................. | H04M 1/18 379/433.01 |
| 7,180,735 B2 | * | 2/2007 | Thomas ............... | G06F 1/1626 206/701 |

(Continued)

FOREIGN PATENT DOCUMENTS

| | | |
|---|---|---|
| KR | 10-1027766 B1 | 4/2011 |
| WO | 03/005684 A1 | 1/2003 |

*Primary Examiner* — Courtney Smith
*Assistant Examiner* — Rashen E Morrison
(74) *Attorney, Agent, or Firm* — Cha & Reiter, LLC

(57) ABSTRACT

A portable terminal including a body, a front deco positioned along a periphery of the body, a main battery cover positioned on a rear surface of the body to cover a battery, and a waterproofing cover interchangeable with the front deco and the main battery cover so that when substituted for the main battery cover and front deco all water intrusion paths on the portable terminal are sealed.

15 Claims, 8 Drawing Sheets

(56) References Cited

U.S. PATENT DOCUMENTS

| | | | | |
|---|---|---|---|---|
| 7,464,814 B2* | 12/2008 | Carnevali | G06F 1/1626 | 206/320 |
| 7,558,054 B1* | 7/2009 | Prest | H05K 5/0239 | 361/679.3 |
| 7,561,684 B2* | 7/2009 | Tsutaichi | H04M 1/18 | 379/433.01 |
| 7,609,512 B2* | 10/2009 | Richardson | G06F 1/1626 | 361/679.02 |
| 7,697,281 B2* | 4/2010 | Dabov | G06F 1/1626 | 361/679.55 |
| 7,889,139 B2* | 2/2011 | Hobson | H01Q 1/243 | 343/702 |
| 7,941,195 B2* | 5/2011 | Peng | H04B 1/3888 | 455/550.1 |
| 7,941,196 B2* | 5/2011 | Kawasaki | H04B 1/3888 | 379/428.01 |
| 8,032,194 B2* | 10/2011 | Liu | H04M 1/0249 | 277/591 |
| 8,058,553 B2* | 11/2011 | Saito | G06F 1/1616 | 174/135 |
| 8,150,485 B2* | 4/2012 | Lee | G06F 1/1626 | 379/428.01 |
| 8,155,717 B1* | 4/2012 | Watson | H04M 1/18 | 361/679.56 |
| 8,191,706 B1* | 6/2012 | Liu | G06F 1/1628 | 206/320 |
| 8,204,561 B2* | 6/2012 | Mongan | A45C 11/00 | 206/592 |
| 8,295,896 B2* | 10/2012 | Jeon | A45C 11/00 | 396/27 |
| 8,403,136 B1* | 3/2013 | Tsai | H05K 5/061 | 206/320 |
| 8,439,191 B1* | 5/2013 | Lu | H04B 1/3888 | 206/320 |
| 8,505,718 B2* | 8/2013 | Griffin, Jr. | A45C 11/00 | 206/320 |
| 8,558,796 B2* | 10/2013 | Giancarlo | G06F 1/1662 | 345/168 |
| 8,824,126 B2* | 9/2014 | Kurihara | B29C 45/4471 | 206/305 |
| 8,831,538 B2* | 9/2014 | Yuen | A61B 5/222 | 455/556.1 |
| 8,939,284 B2* | 1/2015 | Kumagai | H04M 1/0214 | 206/320 |
| 2003/0003864 A1* | 1/2003 | Locke | H04B 5/0006 | 455/41.1 |
| 2003/0048597 A1* | 3/2003 | Wang | G06F 1/1626 | 361/679.56 |
| 2003/0095374 A1* | 5/2003 | Richardson | G06F 1/1626 | 361/679.3 |
| 2004/0089570 A1* | 5/2004 | Chien | H04M 1/18 | 206/320 |
| 2005/0130721 A1* | 6/2005 | Gartrell | H04M 1/0283 | 455/575.8 |
| 2006/0189192 A1* | 8/2006 | Onoda | H01R 13/5216 | 439/274 |
| 2007/0184781 A1* | 8/2007 | Huskinson | H04M 1/185 | 455/42 |
| 2007/0189120 A1* | 8/2007 | Yang | B29C 66/542 | 367/131 |
| 2008/0081679 A1* | 4/2008 | Kawasaki | H04B 1/3888 | 455/575.8 |
| 2008/0083631 A1* | 4/2008 | Tsang | A45C 11/18 | 206/320 |
| 2008/0105526 A1* | 5/2008 | Wee | H01H 13/705 | 200/5 A |
| 2008/0146293 A1* | 6/2008 | Kim | H04M 1/0252 | 455/575.1 |
| 2008/0251512 A1* | 10/2008 | Griffin | A45C 11/00 | 220/4.02 |
| 2009/0009945 A1* | 1/2009 | Johnson | G06F 1/1613 | 361/679.27 |
| 2009/0049773 A1* | 2/2009 | Zadesky | B32B 17/10018 | 52/204.62 |
| 2009/0080153 A1* | 3/2009 | Richardson | H04M 1/18 | 361/679.56 |
| 2009/0111539 A1* | 4/2009 | Matsuda | G06F 1/1616 | 455/575.3 |
| 2009/0257207 A1* | 10/2009 | Wang | G06F 1/1626 | 361/752 |
| 2009/0260844 A1* | 10/2009 | Tseng | H05K 5/069 | 174/50.5 |
| 2009/0270135 A1* | 10/2009 | Shoji | H04M 1/021 | 455/566 |
| 2010/0008028 A1* | 1/2010 | Richardson | G06F 1/1626 | 361/679.01 |
| 2010/0085691 A1* | 4/2010 | Yeh | H04M 1/0249 | 361/679.01 |
| 2010/0096284 A1* | 4/2010 | Bau | B65D 85/00 | 206/320 |
| 2010/0104814 A1* | 4/2010 | Richardson | H04B 1/3888 | 428/156 |
| 2010/0147737 A1* | 6/2010 | Richardson | A45C 11/00 | 206/701 |
| 2010/0164836 A1* | 7/2010 | Liberatore | G06F 1/1616 | 345/1.1 |
| 2010/0195275 A1* | 8/2010 | Kim | H05K 5/061 | 361/679.01 |
| 2010/0203931 A1* | 8/2010 | Hynecek | A45C 11/00 | 455/575.8 |
| 2010/0206601 A1* | 8/2010 | Choraku | H05K 5/061 | 174/50.5 |
| 2011/0024315 A1* | 2/2011 | Kim | H04M 1/18 | 206/320 |
| 2011/0058320 A1* | 3/2011 | Kim | H04M 1/0252 | 361/679.01 |
| 2011/0090652 A1* | 4/2011 | Wee | H05K 5/069 | 361/749 |
| 2011/0110022 A1* | 5/2011 | Kumagai | G06F 1/1616 | 361/679.01 |
| 2011/0211820 A1 | 9/2011 | Yim | | |
| 2011/0228458 A1* | 9/2011 | Richardson | H04M 1/0252 | 361/679.01 |
| 2012/0020045 A1* | 1/2012 | Tanase | H01H 13/85 | 361/807 |
| 2012/0045679 A1* | 2/2012 | Ishida | H01M 2/1066 | 429/100 |
| 2012/0074005 A1* | 3/2012 | Johnson | H04B 1/3888 | 206/320 |
| 2013/0220847 A1* | 8/2013 | Fisher | B65D 25/005 | 206/216 |
| 2013/0242481 A1* | 9/2013 | Kim | H05K 5/06 | 361/679.01 |
| 2013/0252061 A1* | 9/2013 | Kim | H01M 2/1022 | 429/100 |
| 2013/0265715 A1* | 10/2013 | Bae | G06F 1/1656 | 361/679.55 |
| 2014/0104795 A1* | 4/2014 | Wee | H05K 7/14 | 361/752 |
| 2014/0185206 A1* | 7/2014 | Kim | H05K 5/0017 | 361/679.01 |
| 2014/0252229 A1* | 9/2014 | Kondo | A61B 6/4283 | 250/336.1 |
| 2014/0262847 A1* | 9/2014 | Yang | A45C 11/00 | 206/37 |
| 2014/0333831 A1* | 11/2014 | Oh | H04N 5/2254 | 348/376 |
| 2015/0014188 A1* | 1/2015 | Pyo | A45C 11/00 | 206/37 |

* cited by examiner

PORTABLE TERMINAL

CLAIM OF PRIORITY

This application claims priority under 35 U.S.C. §119(a) to a Korean Patent Application entitled "Portable Terminal" filed in the Korean Intellectual Property Office on Apr. 9, 2012 assigned Serial No. 10-2012-0036824, the contents of which are incorporated herein by reference.

BACKGROUND

1. Technical Field

The present disclosure relates to a portable terminal, and more particularly, to a portable terminal adaptable for an indoor purpose or for an outdoor purpose.

2. Description of the Related Art

Recently, portable terminals have evolved to include multimedia devices capable of providing various additional services, such as an electronic organizer function, a game function, a schedule management function, etc. To perform these advanced tasks, portable terminals are connected to various external devices to further expand their functions, such as music listening, movie watching, image taking, etc. Widespread use of such portable terminals is followed by increasing demands for waterproofing during daily activities. Particularly, any portable terminal has various gaps resulting from required coupling of its components or connection to an external device. Such gaps of a portable terminal are potential paths for water intrusion. For example, there is a gap between the body of a portable terminal and its battery cover, which is fastened to the body to cover a battery mounted on the body. Portable terminals also have various connectors for connection with external devices, such as speakers, earphones, chargers, etc., creating gaps. Such gaps of portable terminals inevitably create various types of water intrusion paths, which can become problematic during common daily activities.

Various waterproofing devices have been proposed to prevent water intrusion through such gaps of portable terminals. An example of the prior art is disclosed in U.S. Patent Application No. 2006/0189192, entitled "Waterproof Connector" (publication date: Aug. 24, 2006). In many of the known prior arts, including the above-referenced application, each water intrusion path is provided with a separate component to attempt seal the path. However, it is difficult to effectively seal each water intrusion path using these separate components.

In an attempt to solve this problem, Korean Patent Registration No. 10-1027766, entitled "Portable Terminal Protecting/Waterproofing Package" (registration date: Mar. 31, 2011), discloses a device for waterproofing an entire portable terminal. This device according to the prior art is fastened to contact the entire exterior of a portable terminal to maintain it in a fully waterproof condition. Such a protecting/waterproofing cover can store/maintain a portable terminal fully waterproofed by covering the entire portable terminal. However, this attempted solution creates the additional problem of covering the connectors to be used for future connection with external devices. More specifically, if a gap associated with a connector for connection with an external device remains covered by a waterproofing cover, the user cannot connect an external device as desired; on the other hand, if the gap associated with the connector for external connection remains uncovered, it can act as a water intrusion path. In summary, there is no solution for waterproofing of a portable terminal while maintaining its functionality.

SUMMARY

Accordingly, the present invention has been made to solve the above-stated problems occurring in the prior art and provides additional advantages, by providing a portable terminal having a configuration adapted to be used in daily life (e.g., indoor environment) and a separate configuration adapted to be used in an environment that is likely to damage the portable terminal (e.g., mountain climbing, tracking, or other types of outdoor activities), thereby preventing any damage to the portable terminal.

In accordance with an exemplary embodiment of the present invention, a portable terminal includes: a body; a front deco disposed along a periphery of the body; a main battery cover disposed on a rear surface of the body to cover a battery, and a waterproofing cover interchangeable with the front deco and the main battery cover, wherein the interchangeable waterproofing cover seals a water intrusion path on the portable terminal.

In another aspect of the present disclosure, the waterproofing cover is fastened at the same position where the front deco attaches to the body and along a periphery of a battery mounting space in a twofold manner and is adapted to surround the four lateral and rear surfaces of the body to completely seal gaps of the portable terminal when the front deco and main battery cover are replaced by the waterproofing cover.

In another aspect of the present disclosure, a coupling portion is formed along a periphery of a front surface of the body so that the front deco is detachably fastened to the body by the coupling portion, and the waterproofing cover is coupled to the body by the coupling portion when the front deco is not detachably fastened to the body sealing the water intrusion path.

In another aspect of the present disclosure, the coupling portion includes a protrusion extending in a direction towards a front of the body and is disposed along the periphery of the body and adjacent to and spaced from an outer edge of a display positioned on the front surface of the body, and the front deco has an opening configured to engage with the protrusion of the coupling portion so that the front deco can be detachably attached to the body.

In another aspect of the present disclosure, the portable terminal further includes a sealing opening disposed adjacent to and surrounding a battery mounting space provided on the rear of the body, the sealing opening being configured to be covered by the main battery cover when the waterproofing cover is not being used and coupled to the waterproofing cover when the waterproofing cover is fastened to the body to seal the water intrusion path.

In another aspect of the present disclosure, the waterproofing cover includes a body portion configured to surround four lateral surfaces and a rear surface of the body; a first coupling portion bent from an end of the body portion and coupled to the coupling portion to seal a water intrusion path between the body and the body portion; and a second coupling portion protruding from an inner surface of the body portion and configured to engage with the sealing opening to fasten the body portion to the rear surface of the body and seal a path of intrusion of water into the battery mounting space.

In another aspect of the present disclosure, the coupling portion includes a protrusion extending in a direction towards a front of the body and is disposed along the periphery of the body and adjacent to and spaced from an outer edge of a display positioned on the front surface of the body, and the first coupling portion of the waterproofing cover is engaged to a space between the display and the protrusion of the coupling portion.

In another aspect of the present disclosure, the protrusion of the coupling portion includes an outer surface that faces the display and has a recess, and an inner surface of the first coupling portion of the waterproofing cover has a protrusion extending therefrom configured to engage the recess of the coupling portion protrusion to enhance the coupling strength between the waterproofing cover and body.

In another aspect of the present disclosure, the front deco and the main battery cover include a polyurethane material.

In another aspect of the present disclosure, the waterproofing cover comprises a silicon or urethane material.

In another aspect of the present disclosure, the waterproofing cover includes SUS (Steel Use Stainless) and polycarbonate)+GF (glass fiber) as much as 20%, and is formed by insert injection molding.

In another aspect of the present invention, the front deco has various colors or shapes so that the front deco is coupled to the coupling portion with various shapes, colors, or configurations.

In accordance with another exemplary embodiment of the present invention, there is provided a portable terminal including a leisure cover interchangeable with a battery cover provided on the portable terminal, the leisure cover being mounted along a periphery of a front surface of the portable terminal to seal all of upper, lower, left, and right surfaces and a rear surface portion of the portable terminal.

In another aspect of the present invention, the leisure cover is configured to be fastened to the periphery of the front surface of the portable terminal to cover all gaps of the portable terminal and prevent intrusion of alien substances.

In another aspect of the present invention, a coupling portion is provided on the periphery of the front surface of the portable terminal so that the leisure cover is fastened to the coupling portion.

In another aspect of the present invention, a sealing opening is positioned around a battery mounting space of the portable terminal, and a fastening protrusion is formed on an inner surface of the leisure cover so as to engage with the sealing opening.

In another aspect of the present invention, when the leisure cover is detached from the portable terminal, a front deco is mounted on the coupling portion to improve the aesthetic appearance of the portable terminal, and the battery cover is provided on a rear surface of the portable terminal.

In another aspect of the present invention, the leisure cover includes silicon and urethane materials so as to be detachably attached to the portable terminal, and is formed by insert injection molding using a material comprising SUS (Steel Use Stainless), PC (Polycabonate)+GF (Glass Fiber) as much as 20% to prevent intrusion of alien substances.

In accordance with another exemplary embodiment of the present invention, a waterproofing cover includes a body portion configured to surround four lateral surfaces and a rear surface of a portable terminal; a first coupling portion bent from an end of the body portion, an inside surface of the first coupling portion having a concave recess; and a second coupling portion protruding from an inner surface of the body portion and configured to engage with an opening of the portable terminal to fasten the body portion to a rear surface of the portable terminal.

In accordance with another exemplary embodiment of the present invention, a method of waterproofing a portable terminal including the steps of detaching a main battery cover and a front deco from a portable terminal prior to exposing the portable terminal to water; and substituting the main battery cover and front deco with a waterproof cover that attaches to the portable terminal at the same location the front deco was previously attached to the portable terminal and at an opening in a rear portion of the portable terminal uncovered by the detaching of the main battery cover, wherein the waterproof cover surrounds the portable terminal preventing water from entering external terminals and connection points exposed to the exterior.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Figure 1:
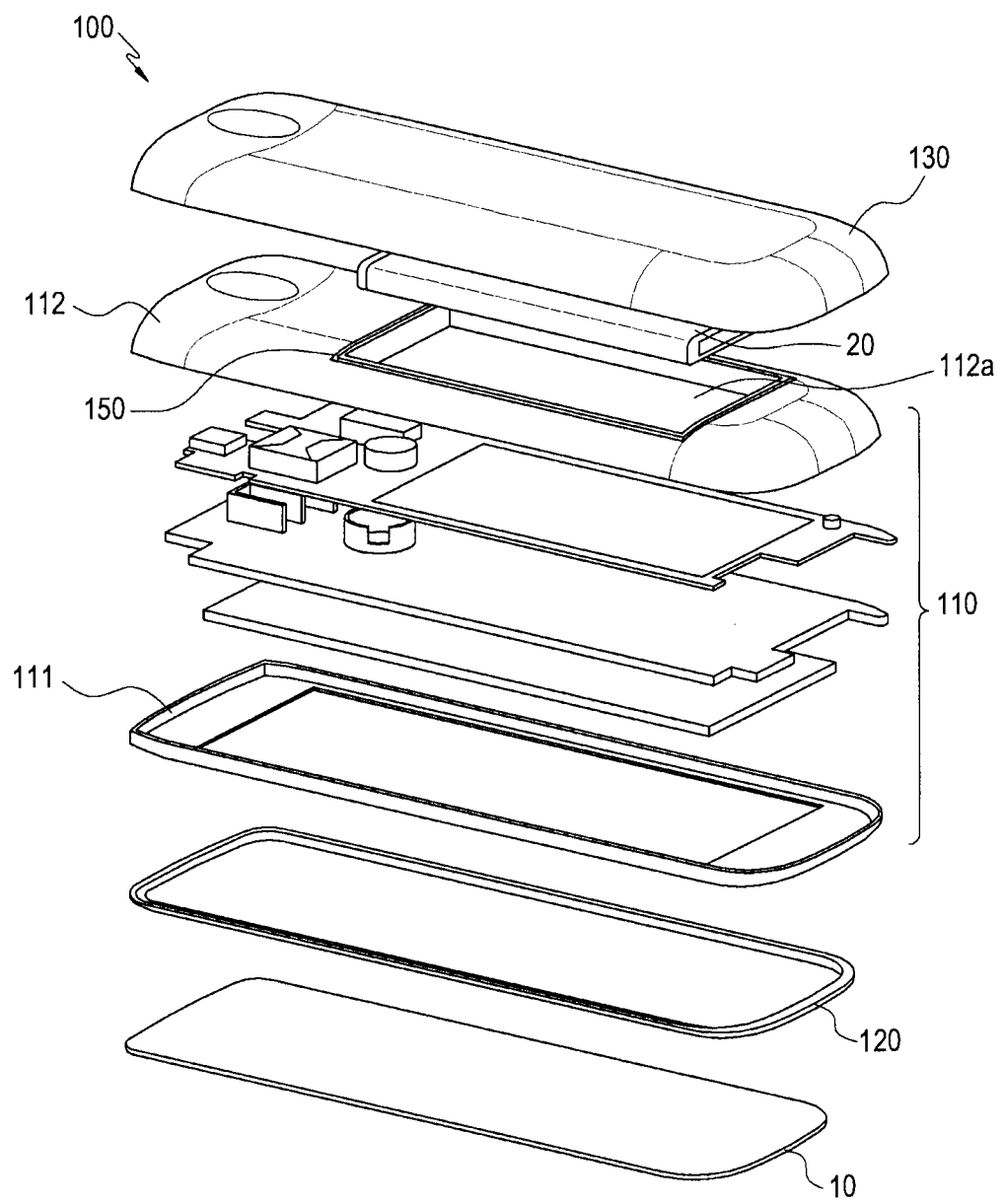
FIG. 1 is an exploded view of a portable terminal according to an embodiment of the present disclosure, the components of which are adapted to indoor use of the portable terminal.

Hereinafter, a portable terminal according to an embodiment of the present disclosure will be described with reference to the accompanying drawings. In this connection, the thickness of lines or the size of components shown in the drawings may be exaggerated to more clearly and conveniently describe the preferred embodiments. Furthermore, the terminology used herein is defined based on consideration of corresponding functions according to the present disclosure, and can be varied according to practices or intentions of users or operators. Therefore, definition of the terminology is to be made based on the overall content of the specification.

In the following description of embodiments of the present invention, ordinal numbers such as "first" and "second" are used, but they are only intended to distinguish objects of the same name, so the order can be determined as desired, and the same description applies to objects of the same name but different ordinal numbers.

The present disclosure provides a portable terminal having different configurations of the portable terminal body according to the environment in which the portable terminal is used. Specifically, the present disclosure seeks to protect the portable terminal not only during its use during daily activities, but also when it is exposed to harsh environments (e.g., mountain biking), in which it is susceptible to external shocks or water intrusion, particularly against intrusion of alien substances (e.g., water). An embodiment of the present disclosure, however, does not provide each gap of a portable terminal (as used herein, a "gap" of a portable terminal refers to any type of opening associated with a coupling portion of the terminal, a connector for connection between the terminal and an external device, or an opening connected to an internal component such as a camera or a speaker) with a component to seal it and prevent the intrusion of alien substances, but provides that every gap of the portable terminal is sealed so that it can be used even in an underwater environment.

In addition, the portable terminal has a front deco and a main battery cover, which can be easily exchanged with a leisure cover (hereinafter, referred to as a waterproofing cover) so that the portable terminal can be protected when used in a harsh environment (e.g., boating), and the appearance can be made more aesthetic by changing the front deco mounted on the portable terminal. A portable terminal according to an embodiment of the present invention will now be described in detail with reference to FIGS. 1-8.

Figure 3:
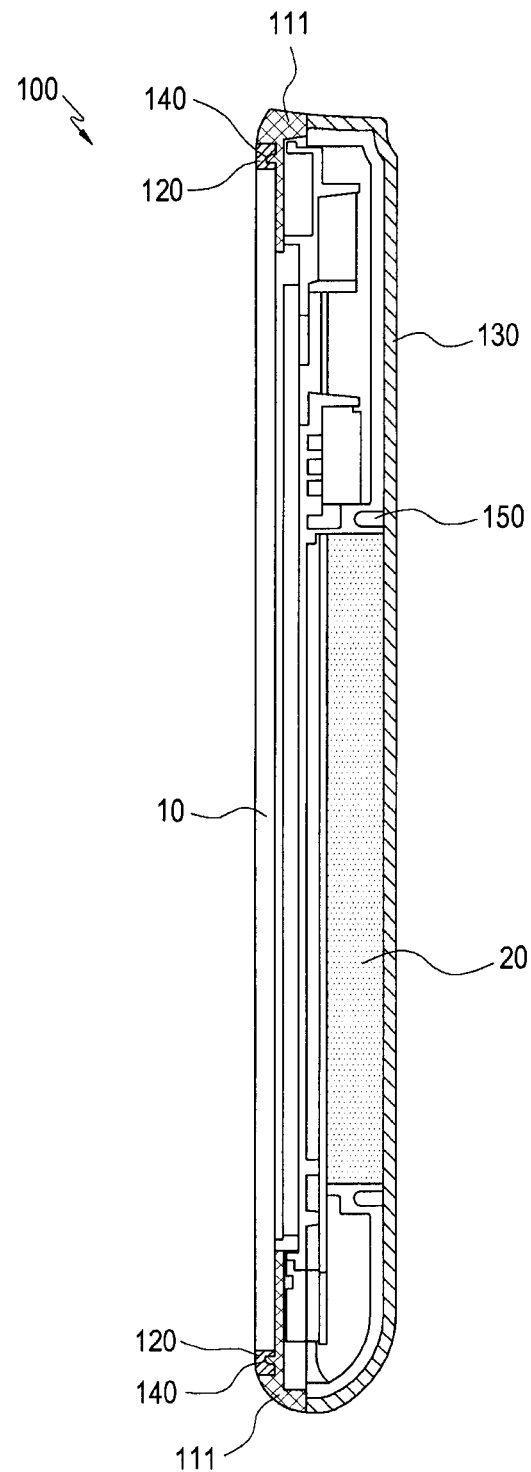
FIG. 3 is a sectional view taken along line A-A' of FIG. 2.
Figure 4:
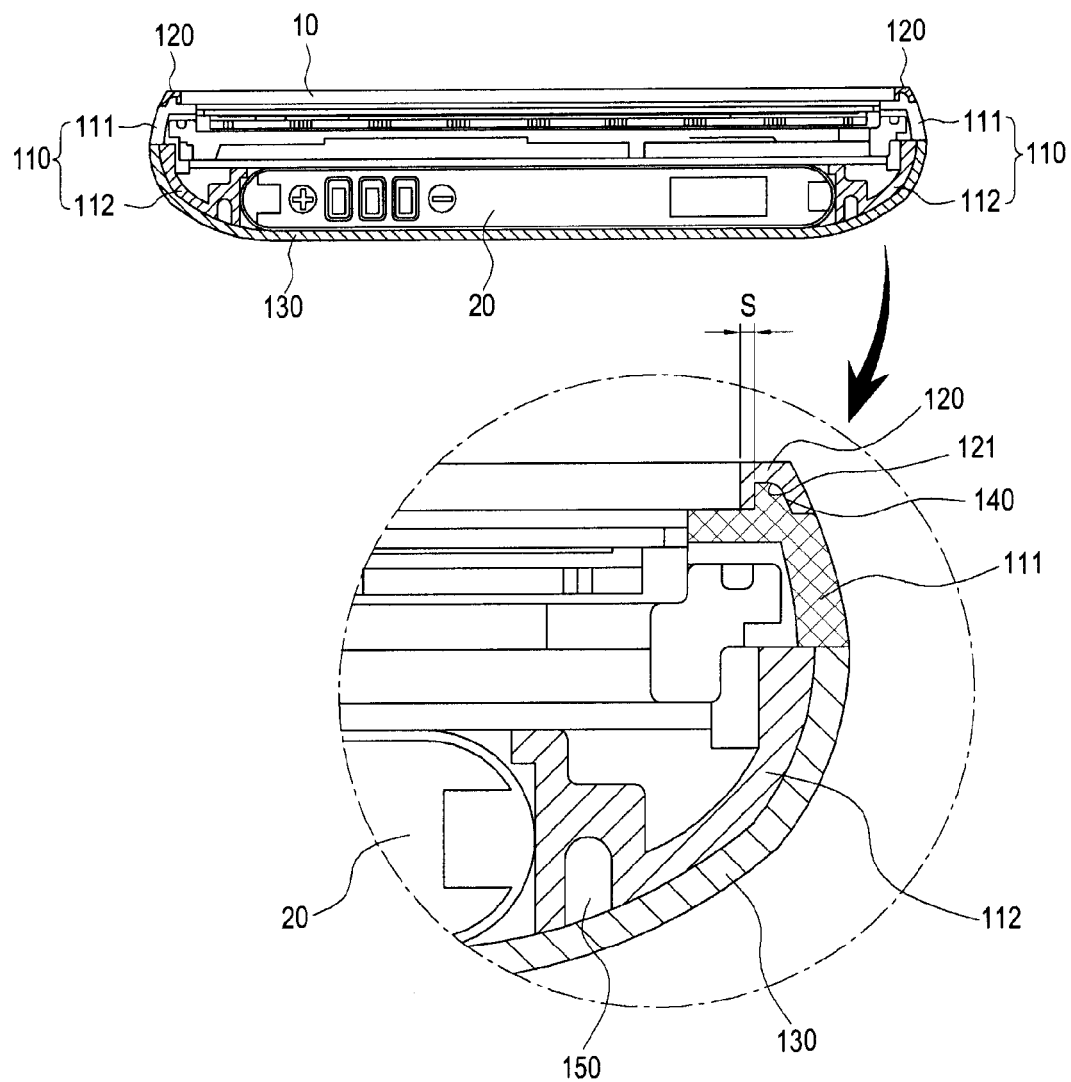
FIG. 4 is a sectional view taken along line B-B' of FIG. 2.
Figure 5:
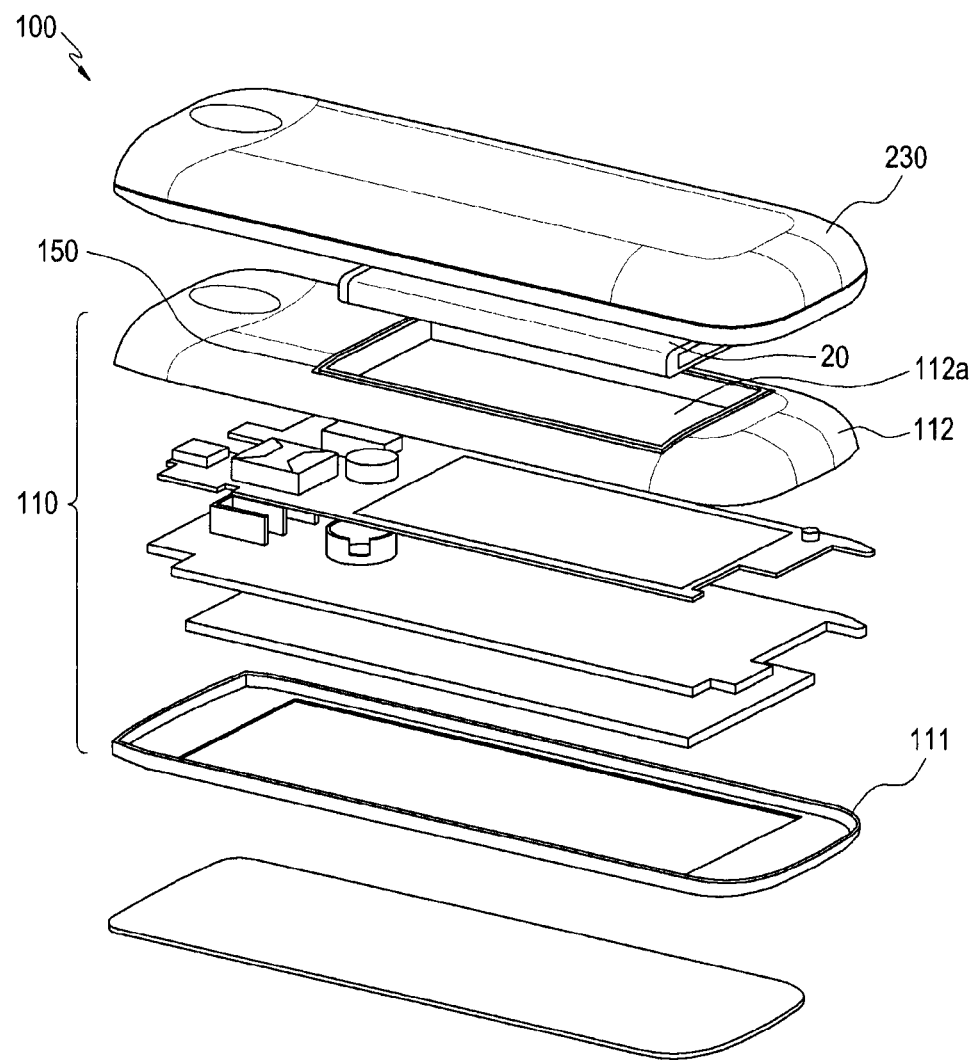
FIG. 5 is an exploded view of a portable terminal according to an embodiment of the present disclosure, the components of which are adapted to use of the portable terminal in an outdoor or water-intrusive environment.

FIGS. 1-4 illustrate a schematic construction of a portable terminal according to an embodiment of the present invention, the portable terminal being adapted for use under ordinary conditions, and FIGS. 5-8 illustrate a schematic construction of the portable terminal adapted for use under conditions that may expose the portable terminal to damage from, for example, water. A simple comparison of FIGS. 1 and 5 is as follows: the portable terminal shown in FIG. 1 is provided with a front deco and a main battery cover, and the portable terminal shown in FIG. 5 is provided with a waterproofing cover after removing the front deco and the main battery cover shown in FIG. 1 from the portable terminal.

FIG. 1 is an exploded view of a portable terminal according to an embodiment of the present invention, the components of which are adapted to normal use (under conditions not posing a risk of damage to the phone) of the portable terminal.

Figure 2:
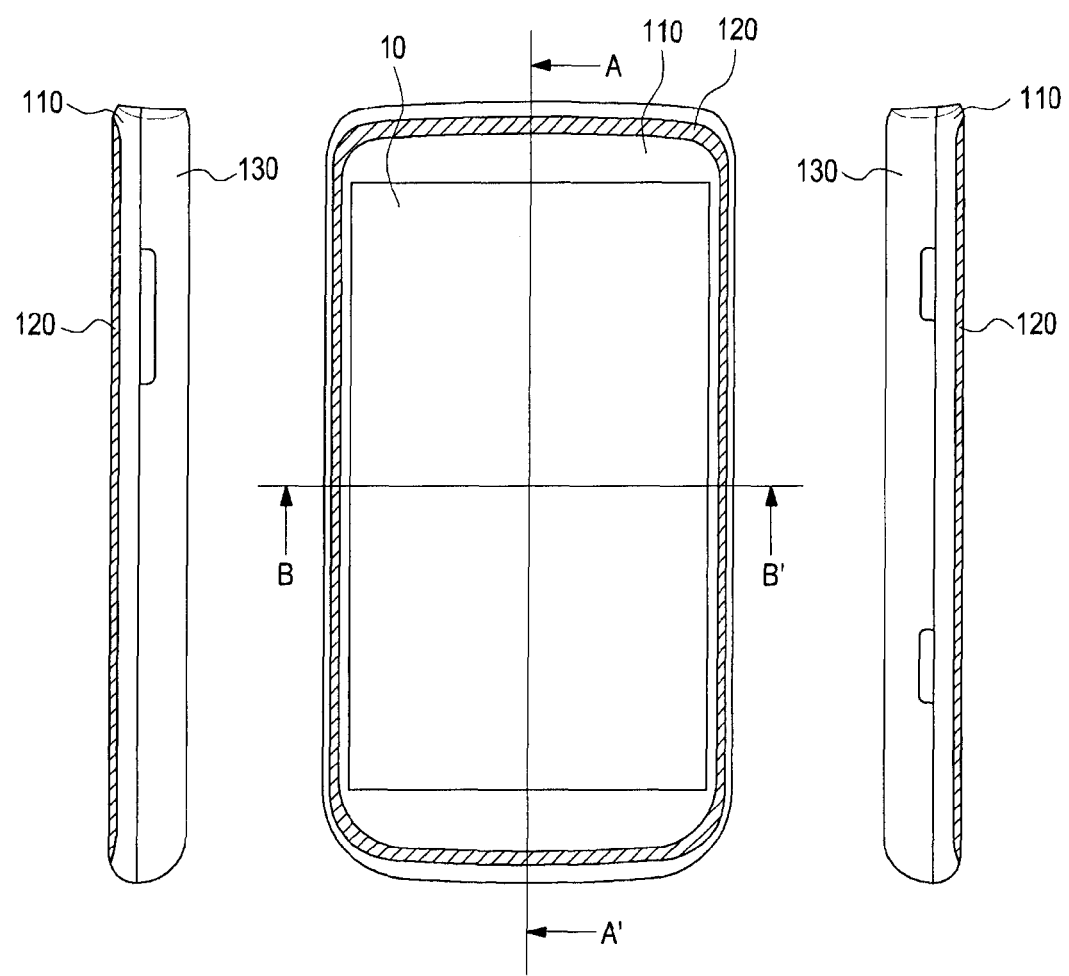
FIG. 2 is a top and both lateral views of the portable terminal shown in FIG. 1, when assembled.

FIG. 2 is a top and both lateral views of the portable terminal shown in FIG. 1, when assembled.

As shown, a portable terminal 100 according to an embodiment of the present invention includes a body 110, a front deco 120, and a main battery cover 130. The body 110 includes a front case 111 and a rear case 112, which are referred to as a body 110 as a whole in the present embodiment, but which will also be described separately if necessary. A display 10 and a front deco 120 are fastened to the front surface of the body 110, particularly along the periphery of the front case 111. The front deco 120 is positioned along the periphery of the body 110 while being spaced from the display 10. The front deco 120 can be simply detachably attached to the front surface of the body 110, particularly by a coupling portion 140 (described later). The front deco 120 can have various shapes and different colors. As a result, the portable terminal 100 can have various expressions by means of the front deco 120 fastened to the body 110. It will be assumed in the present embodiment that the front deco 120 is made of polycarbonate (PC) to prevent cracking or deformation that may occur when it is attached to or detached from the body 110. It will also be assumed that the main battery cover 130 is made of the same material as the front deco 120, i.e. polycarbonate, to prevent deformation or cracking that may occur when it is attached to or detached from the body 110. Those skilled in the art can understand, however, that the material of the front deco 120 and the main battery cover 130 is not limited thereto, and the material of the front deco 120, for example, can be variously modified to implement various colors or shapes.

FIGS. 3-4 are sectional views taken along lines A-A' and B-B' of FIG. 2, respectively.

As shown, the front deco 120 is positioned on the outermost surface of the body 110, preferably the front case 111, to improve the aesthetic appearance of the portable terminal. An inner surface of the front deco 120 has the shape of the letter 'u' so as to engage with the coupling portion 140 (described later) and attach to the front surface of the body 110. The coupling portion 140 includes a protrusion 140 protruding from, for example, the front case 111 of the main body 110 in the forward direction of the body 110 and is spaced from the outer surface of the display 10 by a predetermined distance S. The coupling portion 140 can extend around the entire periphery of the display 10 as one continuous protrusion or may be located in various areas around the display 10 as a plurality of coupling portions 140. As explained further below, the protrusion of the coupling portion 140 engages with the u-shaped inner surface of the front deco 120 detachably attaching the front deco 120 to the front case 111 of the main body 110. Either the front deco 120 or a waterproofing cover 230 can be attached to the coupling portion 140. More specifically, according to the environment in which the portable terminal 100 is used, the front deco 120 is coupled to the coupling portion 140, or the front deco 120 is removed from the coupling portion 140, to which the waterproofing cover 230 is then coupled. A lateral surface of the front deco 120 is drawn into and engaged with the space S between an outer edge of the display 10 and the protrusion 140, and the coupling portion protrusion 140 engages with an opening 121 of the front deco 120, so that the front deco 120 is detachably coupled to the front surface of the body 110. It is also possible, although not shown in the drawings, to form a recess (not shown) on the outer surface of the coupling portion 140 that faces the display, in order to further improve the strength of coupling between the front deco 120 or waterproofing cover 230 and the coupling portion 140, and to form a protrusion on the inner surface of the lateral surface of the front deco 120 or waterproofing cover 230, which engages with the recess of the coupling portion protrusion 140. That is, when the front deco 120 engages with the coupling portion 140, the protrusion is fitted into the recess to increase the strength of coupling.

A rear case 112 is positioned on the rear surface of the body 110 and is provided with a battery mounting space 112a. The main battery cover 130 is mounted on the rear surface of the body 110 so as to cover the rear case 112, on which a battery 20 is mounted. According to the present embodiment, the main battery cover 130 has bent ends so as to cover the rear and all four lateral surfaces of the body 110 (preferably not including the front case 111). A sealing opening 150 is formed on the rear surface of the body 110, particularly along the periphery of the battery mounting space 112a. The sealing opening 150 is covered by the inner surface of the main battery cover 130 when the main battery cover 130 is fastened to the body 110. In addition, a second coupling portion 233 (described later with reference to FIGS. 5-8) of the waterproofing cover 230 (when being used instead of the main battery cover 130) is drawn into the sealing opening 150 to engage with it tightly, so that not only the waterproofing cover 230 is fastened, but any path of intrusion of alien substances (e.g., water) contacting the portable terminal 100 will be blocked.

The portable terminal, into which the above-described components are assembled, is used in an environment where the portable terminal 100 is less likely to be damaged, i.e. during daily activities of the user at home, offices, etc. That is, the user can arrange a desired front deco 120 on the front surface of the body 110 of the portable terminal 100 and mount the main battery cover 130. As such, the user can get a desired design of the portable terminal by mounting the corresponding front deco 120.

On the other hand, when the user uses the portable terminal 100 in an environment where it is likely to be damaged (e.g., outdoor activities including mountain climbing and other leisure sports), the front deco 120 and the main battery cover 130 of the portable terminal 100, which are adapted to be used in daily activities, are removed and replaced with a waterproofing cover 230. That is, the front deco 120 and the main battery cover 130 are interchangeable with the waterproofing cover 230. This will now be described with reference to FIGS. 5-8.

FIG. 5 is an exploded view of a portable terminal according to an embodiment of the present disclosure, the components of which are adapted for use of the portable terminal in an outdoor or water-intrusive environment.

Figure 6:
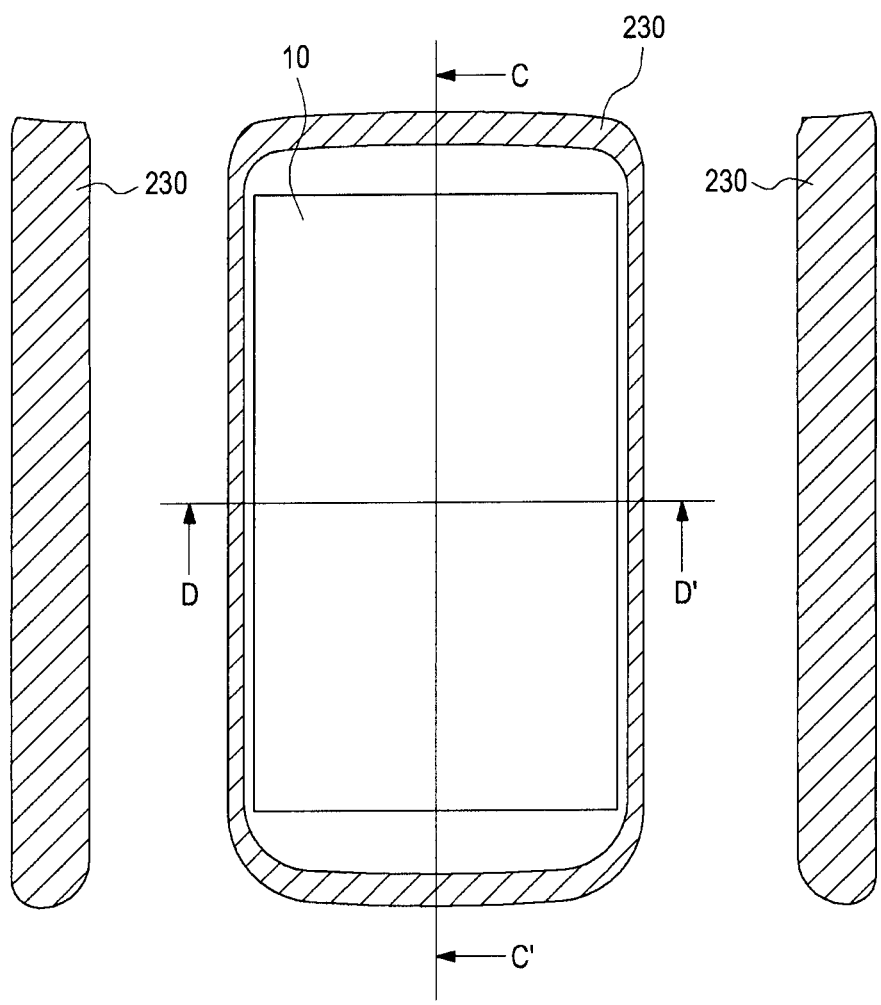
FIG. 6 is a top and both lateral views of the portable terminal shown in FIG. 5, when assembled.

FIG. 6 is a top and both lateral views of the portable terminal shown in FIG. 5, when assembled.

The user replaces the front deco 120 and the main battery cover 130 with the waterproofing cover 230 when they so desire, but will most likely do so when there is an increased likelihood of the mobile device being exposed to water. Specifically, the front deco 120 and the main battery cover 130, which are used during daily activities, are detached and removed from the body 110 by decoupling the coupling portion 140, and the waterproofing cover 230 is arranged to surround the body 110 and attached at a top end of the portable terminal 100 where the front deco was previously and to a bottom end of the portable terminal 100 where the front deco 120 was previously mounted. After the front deco 120 is removed from the front surface of the body 110, the display 10 and the coupling portion 140, which is spaced from the display 10, particularly the protrusion 140, are exposed to the outside. After the main battery cover 130 is removed from the rear surface of the body 110, the rear case 112, the battery mounting space 112a, the battery 20, and the sealing opening 150 are exposed to the outside. In this state, the waterproofing cover 230 is mounted so as to surround the body 110 along the periphery of the body 110 adjacent to the display 10. The waterproofing cover 230 is tightly coupled both to the coupling portion 140, on which the front deco 120 had been previously mounted, and to the sealing opening 150 in a twofold manner. This prevents intrusion of alien substances (e.g., water) into an area between the coupling portion and the coupling surface of the waterproofing cover. The waterproofing cover 230 is adapted to surround the entire body 110 starting from the periphery of the body 110 adjacent to the display 10. Specifically, the waterproofing cover 230 is adapted to cover the front periphery of the body 110, its four lateral surfaces, and the rear surface portion, preferably leaving the display uncovered. As such, the waterproofing cover 230 completely seals all gaps on the body 110, including those on the four lateral and rear surfaces of the body 110.

Figure 7:
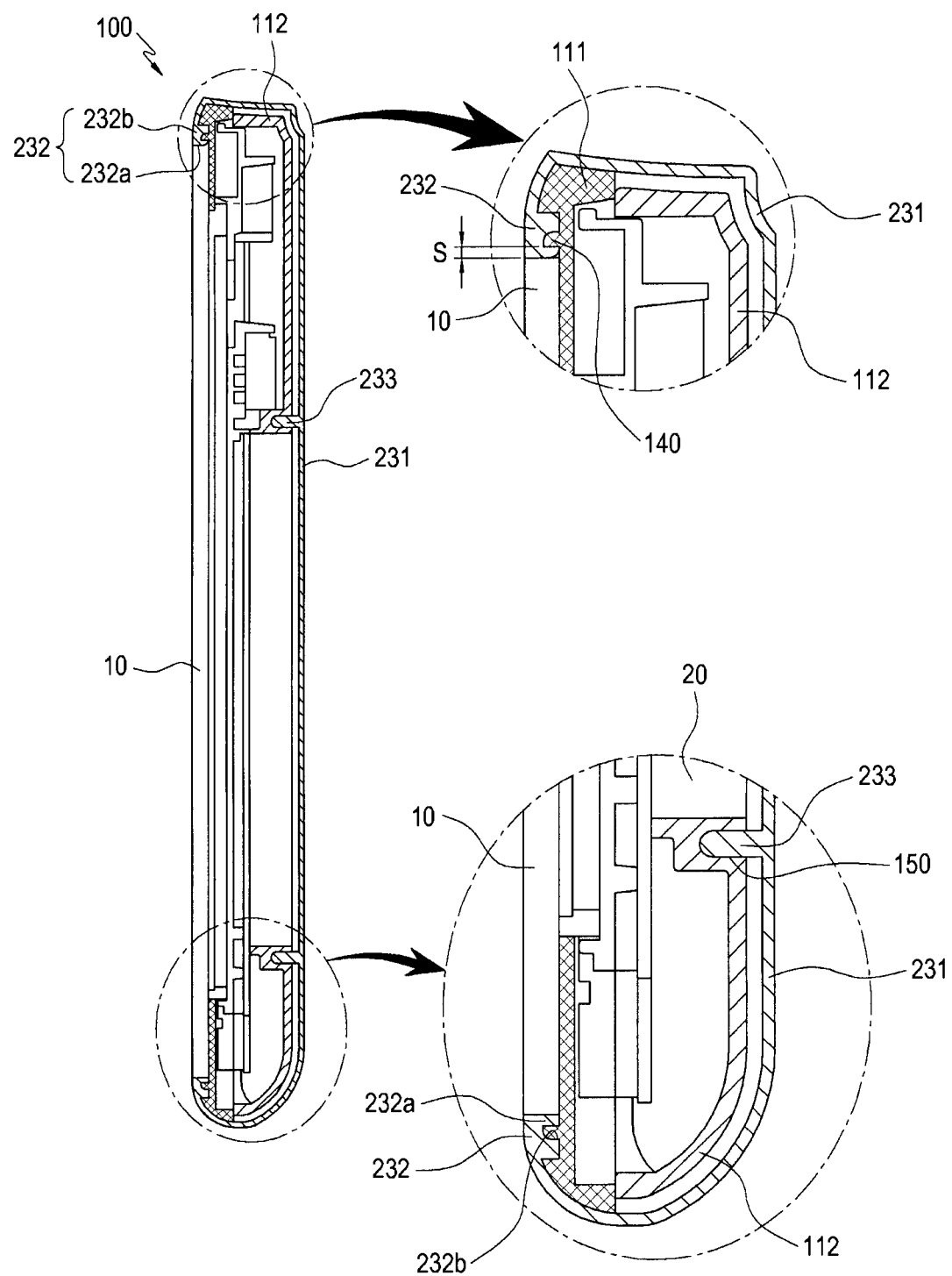
FIG. 7 is a sectional view taken along line C-C' of FIG. 6.
Figure 8:
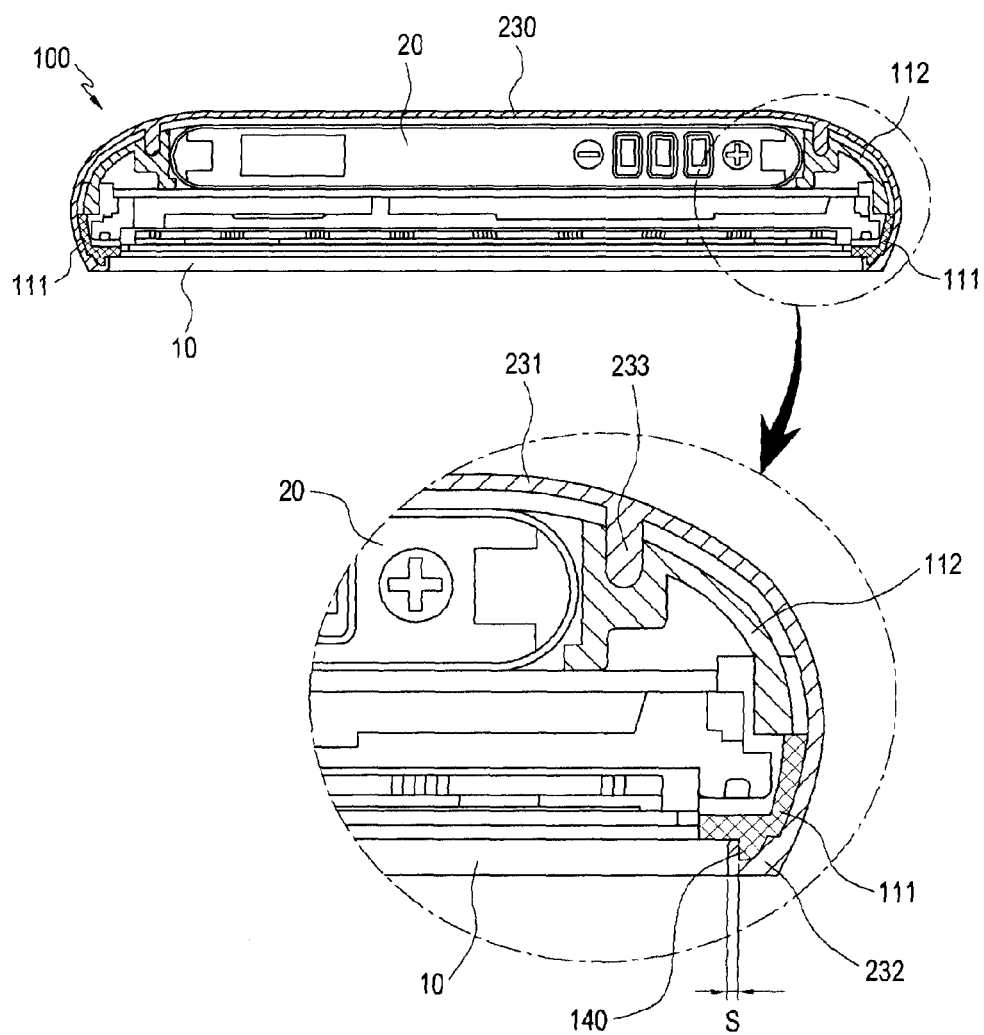
FIG. 8 is a sectional view taken along line D-D' of FIG. 6.

FIGS. 7-8 are sectional views of the portable terminal 100 taken along lines C-C' and D-D' of FIG. 6, respectively.

As shown, the waterproofing cover 230 includes a body portion 231, a first coupling portion 232, and a second coupling portion 233. The body portion 231 is adapted to surround all of the lateral and rear surfaces of the body 110 starting from the front periphery of the body 110. Specifically, the body portion 231 is adapted to surround all lateral surfaces of the body 110 (four lateral surfaces according to the present embodiment) and the rear surface portion and is attached to the portable terminal 100 at a location in which the coupling portion 140 of the body 110 is formed, so that the body 110 of the portable terminal 100 is protected in harsh environments. The body portion 231 has a first coupling portion 232 bent and formed on its end surface so as to be engaged with and coupled to the coupling portion 140. The first coupling portion 232 is tightly fastened to the coupling portion 140 to prevent intrusion of alien substances (e.g., water) coming from a location of the coupling portion 140 and the first coupling portion 232 into the space between the body 110 and the interior of the waterproofing cover 230. To be more specific, the first coupling portion 232 has a bent surface 232a tightly coupled between the display 10 and the protrusion 140 for primary prevention of intrusion of alien substances. Particularly, the waterproofing cover 230 includes silicon, for example, to have elasticity (described later). The bent surface 232a of the first coupling portion 232 fully engages in the space S between the display 10 and the protrusion 140 to seal both the inner and outer sides of the bent surface 232a. In addition, a concave recess 232b is formed on the inside of the bent surface 232a and is tightly coupled to the protrusion 140 for additional prevention of intrusion of alien substances. The size of the concave recess 232b is smaller than that of the protrusion 140 by a predetermined thickness so that the protrusion tightly engages with the recess, i.e. coupled to it with no gap. As such, the end of the waterproofing cover 230 is fastened to the coupling portion 140 of the body 110 with no gap between them, so that the front periphery of the body 110, all of its lateral surfaces, and the rear case 112 are completely sealed.

The second coupling portion 233 (hereinafter, referred to as a fastening protrusion) protrudes from the inner surface of the waterproofing cover 230 towards the rear case 112 so as to be inserted into the sealing opening 150. When the waterproofing cover 230 is mounted to seal and cover the body 110, the fastening protrusion 233 engages with the sealing opening 150, the sealing opening being fastened to the body portion 231 and positioned around the battery mounting space 112a. This increases the coupling strength of the waterproofing cover 230 and seals the interior of the battery mounting space 112a in a twofold manner. As a result, when the body 110 is put into water with the waterproofing cover 230 mounted thereon, the body 110 is sealed at its front periphery so that, besides sealing any water intrusion path, the battery mounting space 112a remains sealed in a twofold manner.

According to the present embodiment, the waterproofing cover 230 is formed by insert injection molding using a material having such properties that it can be easily attached to and detached from the body 110 at the first and second coupling portions 232 and 233, as well as it can prevent the intrusion of alien substances (e.g., water). For example, the waterproofing cover 230 includes not only silicon or urethane, in order to guarantee that it can be easily attached to and detached from the body 110 by the user, but also up to 20% of SUS (Steel Use stainless), PC (polycarbonate), and/or GF (Glass Fiber) in order to secure waterproofing properties. SUS is a kind of steel to put 11% Cr for corrosion resistance. When the waterproofing cover 230 is made of silicon, for example, it can both protect the portable terminal 100 in a harsh environment and implement waterproofing. However, those skilled in the art can understand that the material of the waterproofing cover 230 is not limited to the above examples, and any material can be used as long as it can be easily attached to and detached from the body 110 and, when fastened to the coupling portion 140, it can remain tightly coupled and sealed.

Therefore, the user mounts the front deco 120 and the main battery cover 130 on the body 110 when the portable terminal is used in a normal environment. In an environment involving rough outdoor activities or possible water intrusion, the front deco 120 and the main battery cover 130 are detached from the body 110, and the waterproofing cover 230 is mounted to surround the body. As such, the portable terminal can be used in either environment by simply replacing the above components.

As described above, the portable terminal according to the present invention is advantageous, for example, in that the front deco and the main battery cover can be easily exchanged with the waterproofing cover depending on the environment in which the portable terminal is used.

Particularly, the front deco and the main battery cover are mounted on the body in a normal-use environment and are easily exchanged with the waterproofing cover in an environment making the portable terminal vulnerable to external shocks or water intrusion, so that the portable terminal can be used according to the situation. In other words, simple exchange of specific components guarantees that the portable terminal can be used in either environment while preventing any damage and sealing any water intrusion path on the portable terminal.

Furthermore, the front deco, which provides the portable terminal with an aesthetic appearance, can be easily exchanged according to the user's preferences, so that the portable terminal can have various styles by installing corresponding front decos.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A portable terminal, comprising:
   a body including a coupling portion disposed along a periphery of a front surface of the body;
   a front deco engaging the coupling portion to removably secure the front deco to the body in a sealed relationship;
   a main battery cover disposed on a rear surface of the body to cover a battery; and
   a waterproofing cover interchangeable with the front deco and the main battery cover, wherein the interchangeable waterproofing cover seals a water intrusion path on the portable terminal,
   wherein the waterproofing cover is fastened to the body at the same position where the front deco attaches to the body and along a periphery of a battery mounting space, wherein the waterproofing cover surrounds four lateral and rear surfaces of the body to completely seal gaps of the portable terminal when the front deco and main battery cover are replaced by the waterproofing cover.

2. The portable terminal as claimed in claim 1, wherein the waterproofing cover is coupled to the body by the coupling portion sealing the water intrusion path when the front deco is not detachably fastened to the body.

3. The portable terminal as claimed in claim 2, wherein the coupling portion comprises a protrusion extending in a direction towards a front of the body and is disposed along the front periphery of the body and adjacent to and spaced from an outer edge of a display positioned on the front surface of the body, and wherein the front deco has an opening configured to engage with the protrusion of the coupling portion so that the front deco can be detachably attached to the body.

4. The portable terminal as claimed in claim 2, further comprising a sealing opening disposed adjacent to and surrounding a battery mounting space provided on a rear of the body, the sealing opening being configured to be covered by the main battery cover when the waterproofing cover is not being used and coupled to the waterproofing cover when the waterproofing cover is fastened to the body to seal the water intrusion path.

5. The portable terminal as claimed in claim 4, wherein the waterproofing cover comprises:
   a body portion configured to surround four lateral surfaces and a rear surface of the body;
   a first coupling portion bent from an end of the body portion and coupled to the coupling portion to seal a water intrusion path between the body and the body portion; and
   a second coupling portion protruding from an inner surface of the body portion and configured to engage with the sealing opening to fasten the body portion to the rear surface of the body and seal a path of intrusion of water into the battery mounting space.

6. The portable terminal as claimed in claim 5, wherein the coupling portion comprises a protrusion extending in a direction towards a front of the body and is disposed along the periphery of the body and adjacent to and spaced from an outer edge of a display positioned on the front surface of the body, and wherein the first coupling portion of the waterproofing cover is engaged to a space between the display and the protrusion of the coupling portion.

7. The portable terminal as claimed in claim 6, wherein the protrusion of the coupling portion includes an outer surface facing the display having a recess, and wherein an inner surface of the first coupling portion of the waterproofing cover has a protrusion extending therefrom configured to engage the recess of the protrusion of the coupling portion to enhance the coupling strength between the waterproofing cover and body.

8. The portable terminal as claimed in claim 1, wherein the front deco and the main battery cover comprise a polyurethane material.

9. The portable terminal as claimed in claim 1, wherein the waterproofing cover comprises at least one of a silicon and urethane material.

10. The portable terminal as claimed in claim 9, wherein the waterproofing cover comprises SUS(Steel Use Stainless) and PC(polycarbonate)+GF(Glass Fiber), and is formed by insert injection molding.

11. A portable terminal comprising:
    a leisure cover interchangeable with a battery cover provided on the portable terminal, the leisure cover being mounted along a periphery of a front surface of the portable terminal to seal all of upper, lower, left, and right surfaces and a rear surface portion of the portable terminal,
    wherein a coupling portion is provided on a periphery of the front surface of the portable terminal, forms a sealed relationship with the portable terminal, and
    wherein a sealing opening is disposed around a battery mounting space of the portable terminal, and a fastening protrusion is formed on an inner surface of the leisure cover so as to engage with the sealing opening.

12. The portable terminal as claimed in claim 11, wherein the leisure cover is configured to be fastened to the periphery of the front surface of the portable terminal to cover all gaps of the portable terminal and prevent an intrusion of alien substances.

13. The portable terminal as claimed in claim 11, wherein, when the leisure cover is detached from the portable terminal, a front deco is mounted on the coupling portion to improve the aesthetic appearance of the portable terminal, and the battery cover is provided on a rear surface of the portable terminal.

14. The portable terminal as claimed in claim 11, wherein the leisure cover comprises silicon and urethane materials so as to be detachably attached to the portable terminal, and is formed by insert injection molding using a material comprising SUS(Steel Use Stainless), PC(Polycabonate)+GF(Glass Fiber) to prevent an intrusion of alien substances.

15. A waterproofing cover, comprising: a body portion to surround a front periphery, four lateral surfaces and a rear surface of a portable terminal; a first coupling portion bent from an end of the body portion, wherein an inside surface of the first coupling portion has a concave recess that engages a coupling portion extending around the front periphery of the portable terminal to tightly engage and couple the first coupling portion to the coupling portion of the portable terminal; and a second coupling portion protruding from an inner surface of the body portion and to engage with an opening disposed around a battery mounting space of the portable terminal to fasten the body portion to a rear surface of the portable terminal, terminal, a sealed wherein when the first and second coupling portions are coupled to the portable the body portion is secured relative to the portable terminal and the body portion forms relationship with the portable terminal.

* * * * *